Nov. 15, 1966 D. LABINO 3,285,724
APPARATUS FOR PRODUCING GLASS FIBERS
Filed Dec. 5, 1962 3 Sheets-Sheet 1
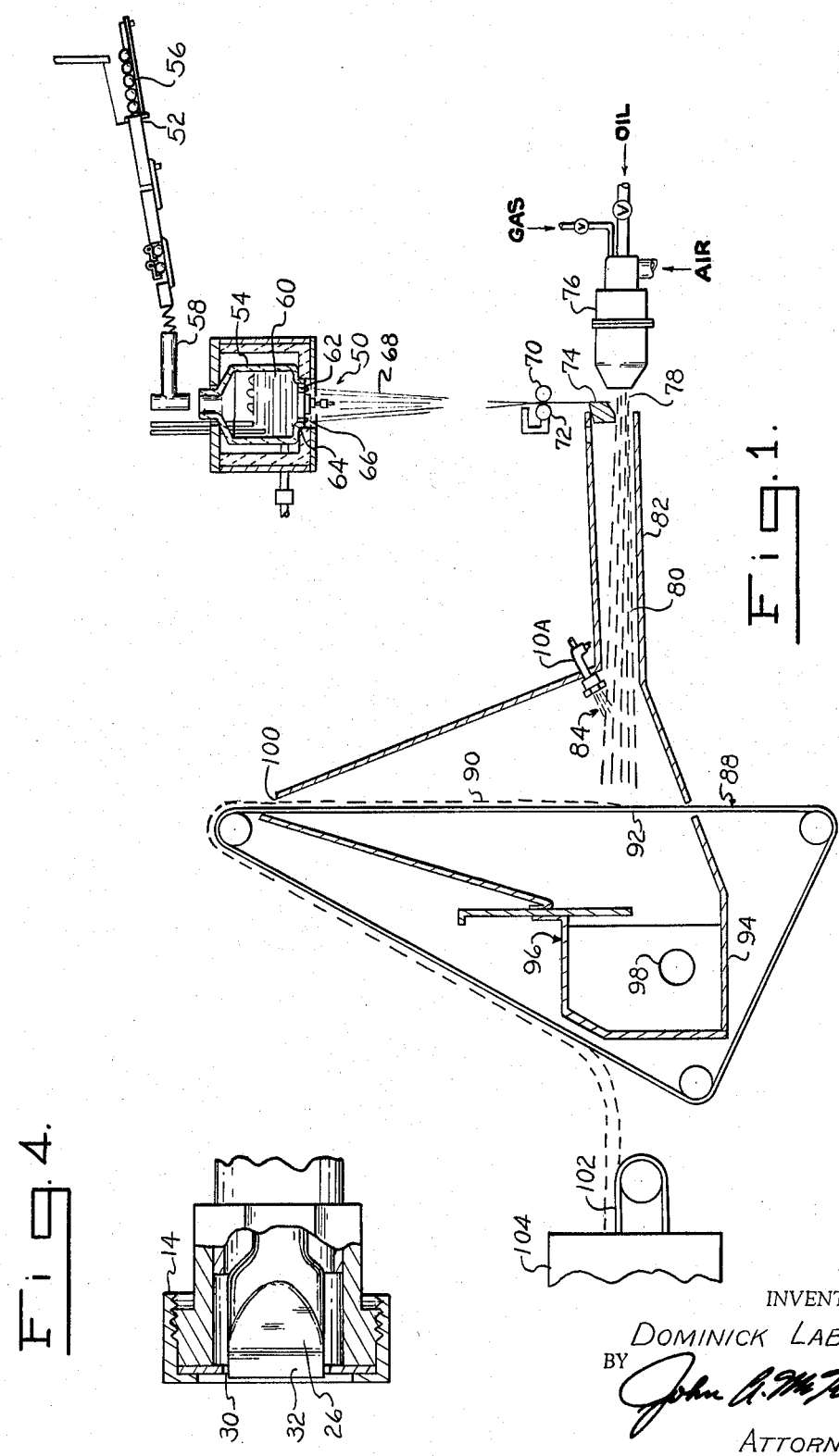
INVENTOR.
DOMINICK LABINO
BY John A. McKinney
ATTORNEY Nov. 15, 1966 D. LABINO 3,285,724
APPARATUS FOR PRODUCING GLASS FIBERS
Filed Dec. 5, 1962 3 Sheets-Sheet 2
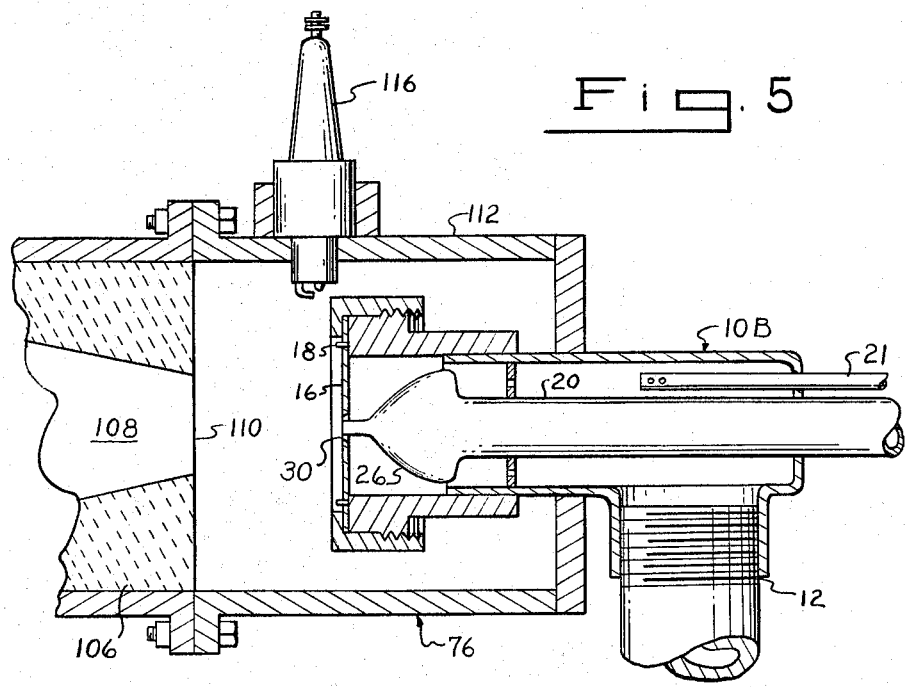
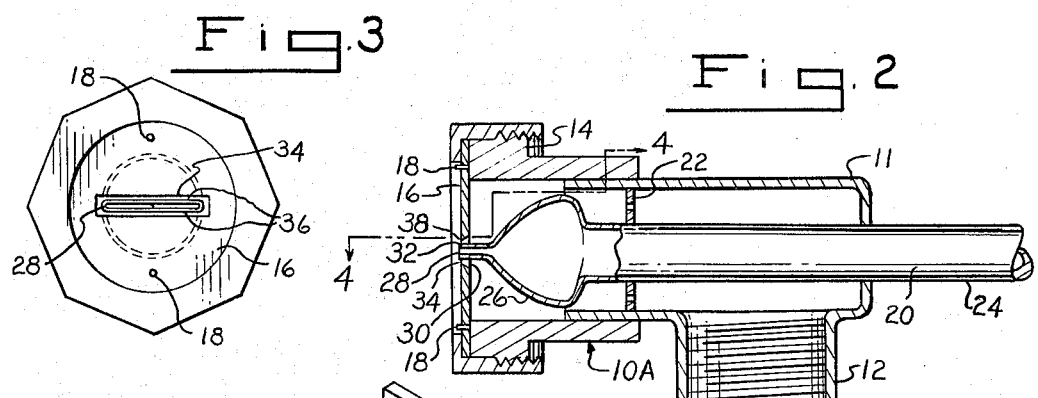
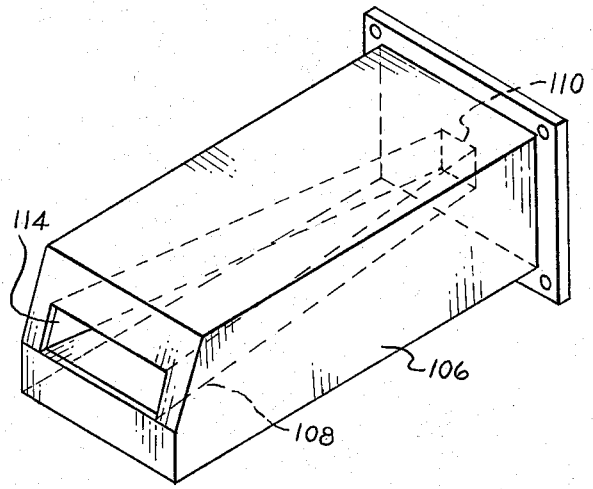
INVENTOR.
DOMINICK LABINO
BY
*John R. McKinney*
ATTORNEY

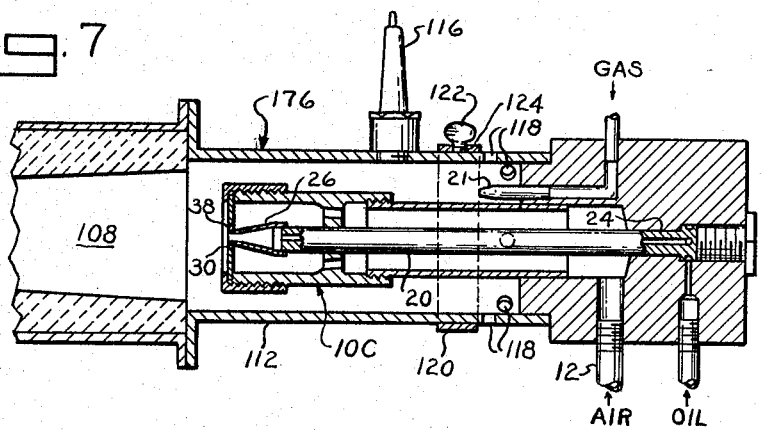

United States Patent Office 3,285,724
Patented Nov. 15, 1966

3,285,724
APPARATUS FOR PRODUCING GLASS FIBERS
Dominick Labino, Grand Rapids, Ohio, assignor to Johns-Manville Corporation, New York, N.Y., a corporation of New York
Filed Dec. 5, 1962, Ser. No. 242,585
7 Claims. (Cl. 65—16)

This invention relates to method and apparatus for producing glass fibers and is particularly directed to nozzles producing a wide spreading spray for use in connection with liquid burners for attenuating the fibers and for use in applying liquid treating material, such as binders, sizes, etc., to the fibers.

In the forming of staple glass fibers, it is customary to establish a supply of molten glass in a receptacle and exude the molten glass through small orifices in the base of the receptacle. Subsequently, filaments are attenuated from the exudations formed at the orifice tips by mechanical means or by the utilization of a hot fluid blast. Continuous or textile filaments are usually attenuated by mechanical means while discontinuous or staple fibers are usually attenuated by a fluid blast including the so-called "flame-drawing" process.

The "blown" staple fibers produced by the flame-drawing process are usually collected on a travelling conveyor to form a mat. Normally, a binder spray zone is provided in front of the conveyor to apply binder material onto the fibers as they are projected in a stream by the blast and before collection on the conveyor.

The customary burner in the "flame-drawing" process is one which burns a combustible mixture comprising a gaseous fuel. For some reason, so far as is known, oil or other liquid fuels have not been used in burners for "blasting" the ends of glass rods formed from fibers drawn from melting bushings.

Historically, glass forming plants have been located in geographic areas where fuel gas is plentiful and relatively inexpensive. Thus economics may have been the prime consideration in the selection of a fuel in the "flame-drawing" process. However, the market for glass fibers has now reached a stage where it is more feasible to install glass processing plants in areas where fuel oil is more readily available and less expensive than fuel gas.

The use of non-gaseous fuels for firing such "flame-drawing" burners presents other special problems not normally encountered when gaseous fuels are used, among which is that of carbon deposition upon the fibers caused by improper atomization or vaporization of the fuel.

The customary form of nozzle employed for applying binder or other treating materials to fibers directs a conical or substantially cylindrical fluid stream. In the treating of a planar stream of fibers, such nozzles are not as efficient as they might be, e.g., since the fluid stream is conical, more binder is projected onto the center of the fiber stream than on the lateral sides of the fiber stream. Hence, the binder application at the center is excessive and wasteful. Also, some of the prior nozzles do not provide the requisite degree of atomization of the treating liquid for efficient application to fine materials such as fine filaments of glass.

Accordingly, it is an object of this invention to provide new and improved method and apparatus for producing flame attenuated and liquid treated glass fibers.

Another object of this invention is to provide method and apparatus for utilizing fuel oil as a fuel component in flame attenuation of glass fibers.

Still another object of this invention is to provide improved method and apparatus for spraying liquid treating material in an extended surface pattern.

The present invention is illustrated as embodied in method and apparatus employing novel air to liquid atomizer means to finely disperse liquids used in the process of forming fiber glass mats. According to a preferred embodiment of the invention, a plurality of glass filaments are drawn from the exudations formed by drawing molten glass through a plurality of orifices defined in the base portion of a melting receptacle. Fluid propulsion means draw the filaments and attenuate them into fibers. The propulsion means preferably is in the form of a burner having a free flow refractory combustion chamber, an air supply pipe body and a hydrocarbon fuel supply pipe extending through the air pipe and terminating in an elongated or flattened open end of substantially rectangular cross section, when viewed from the front of the burner. The air pipe terminates with an orifice having a configuration corresponding substantially to the recangular cross section of the fuel supply pipe and the longitudinal sides of the orifice taper away from the interior of the air pipe and in a direction toward the fuel pipe. The air emanating from the air supply pipe aspirates the fuel, and the admixture is discharged into a free flow refractory combustion chamber from whence the resultant products of combustion are discharged through a rectangular port, which port is positioned so that the blast therefrom projects the fibers in an air-borne stream. Spray means including a spray nozzle having a construction corresponding substantially to that described in connection with the burner may be employed to spray liquid treating material as they are projected in said stream. Fiber collection means are also provided to collect said fibers in a mat form as they are projected by the burner means.

This invention will be better understood from the following description of a preferred embodiment taken in connection with the accompanying drawings, and its scope will be pointed out in the appended claims.

In the drawings:
FIG. 1 is a schematic elevational view of the apparatus adapted for the production of glass fibers and utilizing the nozzle structure of the present invention;
FIG. 2 is a cross-sectional elevational view of a preferred embodiment of the nozzle structure of the present invention when employed to spray liquid treating material;
FIG. 3 is a front elevational view of the nozzle shown in FIG. 2;
FIG. 4 is a fragmentary cross-sectional plan view of the nozzle taken along lines 4—4 of FIG. 2;
FIG. 5 is a cross-sectional elevational view of the burner structure of the present invention which embodies the nozzle of the present invention;
FIG. 6 is a perspective view of the refractory combustion chamber of the burner structure of the present invention; and
FIG. 7 is a view similar to FIG. 5 but of an alternate burner embodiment.

While the method and apparatus of the present invention will be described in connection with the production of staple glass fibers, it will be apparent that this invention, particularly some of the sub-combination aspects, may be employed equally well in other processes.

Referring to FIG. 1, the apparatus of the present invention includes a primary filament forming section 50 comprising a marble feeder 52 for feeding glass marbles at a metered rate into a melting receptacle, shown to be in the form of a refractory crucible 54. The crucible 54 is heated by hot products of combustion to melt the glass marble increments 56 supplied through conduit 58. The molten glass 60 is exuded through a plurality of orifices 62 provided in the bottom base portion 64 of crucible 54 to form a plurality of exudations 66 from which primary filaments 68 are drawn vertically downwardly. As the filaments 68 are initially drawn, preferably by a pair of feed rolls 70 and 72, they become solidified and are advanced to guide 74. Positioned below and adjacent the guide is a burner 76, forming flame attenuating means and an important aspect of this invention. As the primary filaments 68 are advanced past the guide 74 they are exposed to the high velocity heated fluid blast 78 for further advancement and attenuation into extremely fine fibers 80.

The blast 78 projects the fibers 80 through forming tube 82 past a binder spray zone 84, which may incorporate the novel liquid treating means in the form of spray nozzle 10 of this invention, and onto a continuous conveyor 88, which may be in the form of a foraminous belt. The fibers 80 collect in mat form 90 on the conveyor 88. The thickness of the formed mat is contingent upon the fiber output of burner 76 and the travel speed of conveyor 88. To assist in forming mat 90, air is drawn through the forming tube 82 and through the openings of the belt 92 of conveyor 88. The air passes through baffle box 94 of exhaust chamber 96 and is exhausted through opening 98.

The mat 90 moves with belt 92 out through opening 100 of exhaust chamber 96 for advancement to belt 102 and through oven 104 where the binder applied at 84 may be cured and the mat 90 compressed to a preselected thickness and density.

As indicated previously, two of the important features of this invention are the flame attenuating means and the liquid treating means, both of which means incorporate a new and novel air/liquid atomizing nozzle generally designated by the numeral 10. For purposes of clarification the binder spray nozzle is designated by the reference 10A and the burner nozzle is designated by the reference 10B. The binder spray nozzle 10A and the burner nozzle 10B are identical; however, an optional feature, to be described hereinafter, may be incorporated in the burner nozzle 10B.

The air/liquid atomizing nozzle 10 comprises an induction pipe 11 having an end 12 adapted to be connected to a main air supply (not shown). A half-union 14, threaded on the other end of the pipe 11, retains an orifice plate 16 positioned by means of pins 18.

A fluid supply pipe 20 extends through induction pipe 11 and is supported within pipe 11 by web 22. The rearward end 24 is adapted to be connected to a supply of fluid (not shown). At its forward end the pipe 20 is enlarged to form a nozzle head 26. The nozzle head 26 is flattened in a vertical direction to define a horizontally elongated discharge opening 28 of substantially rectangular configuration through which fluid is projected.

An aperture 30, also of substantially rectangular configuration, is provided in orifice plate 16, which plate together with the encompassed terminal portion 32 of nozzle head 26 defines an orifice 34 through which air is passed to aspirate fluid through opening 28. The propellant air and aspirated fluid are projected at high velocity in an extended surface pattern as a wide sheet.

The longitudinal sides 36 defining orifice 34 are preferably tapered in the direction of the air flow to provide an edge 38 to minimize flow resistance and to impart a small vertical component to the emanating air to assist in the atomization of the fluid.

It is important to note that the orifice 34 and opening 28 are substantially in vertical alignment. The alignment of orifice 34 and opening 28 enhances the atomization of the liquid by the propellant since the maximum expansion area is defined. If the nozzle head 26 terminated within induction pipe 11, expansion would be restricted and some turbulence might be set up and tend to reduce the atomizing force of hte propellant air stream.

The air/liquid atomizing nozzle 10 as just described when connected to a suitable low pressure air supply, preferably in the order of 6 lb./in.$^2$, may be advantageously employed to apply binder material in the spray zone 84. However, it will be understood that the nozzle 10 may also be employed with other treating material and in other environments. The advantages of the described nozzle are increased atomization, a flat wide spray corresponding to the pattern of stream of fibers being treated, and consequently better coverage with and less waste of the treating material.

The burner structure 76 of this invention as utilized in the aforedescribed process and environment is shown in FIG. 4 to incorporate the air/liquid atomizing nozzle 10. The burner 76 also comprises a refractory combustion tunnel 106 having a free flow combustion chamber 108. At the inlet port 110 of chamber 108 is a metal shell 112 housing and suitably positioning the nozzle 10 for discharging fuel oil in finely divided condition into chamber 108. The inlet port 110 and exhaust port 114 are suitably of rectilinear cross section. The exhaust port 114 is preferably of elongated rectangular cross section and adapted to produce a flat wide flame for contacting the advancing ends of primary filaments 68 as described in connection with FIG. 1.

A spark plug 116 may be provided in shell 112 to ignite the combustible admixture discharged through nozzle 10. Optionally, a gaseous fuel supply pipe 21 may be connected to a gaseous fuel supply through suitable connections and valves to provide a burner 76 with a combustible admixture to facilitate its initial firing. After the refractory of combustion chamber 108 is heated to incandescence,, the gaseous fuel supply may be discontinued and the introduction of the fuel oil started.

In operation, air is introduced into the free flow combustion chamber 108 through aperture 30 at a pressure in the order of 6 lb./in.$^2$ for low pressure operation. At high pressure operations, the air is introduced at a pressure in the order of 40 lb./in.$^2$. Whether high or low pressure operation is employed is contingent upon the burning characteristics of the fuel oil being combusted. The fuel oil is fed at pressure suitable to maintain stable combustion, which in some instances may be zero pressure. It is intended that the air stream aspirate the fuel oil at a rate to provide a stable flame.

An advantage obtained by employing the nozzle 10 in a burner of the type disclosed is that the pattern of the admixture stream of air and fuel oil conforms better to the cross section of the combustion tunnel 108 than to the normally cylindrical pattern and hence free flow of the burning mixture as well as combustion of the fuel oil is greatly enhanced. The configuration of the free-flow combustion chamber is such that the inlet port and the outlet port are at least equal in area. Thus there is no restriction for exhausting of the products of combustion from the burner. Furthermore, the products of combustion blast are discharged in a relatievly wide pattern conforming to the lateral spread of the primary filaments being attenuated into fibers. A still further advantage is that of increased atomization of the fuel oil, which atomization enhances complete combustion of the fuel oil.

In FIG. 7, a preferred embodiment of liquid fuel burner is illustrated. Some liquid fuels require more air to form a combustible mixture than others and the burner 176 of FIG. 7 includes means whereby a controlled supply of air, in addition to the high pressure inspirating air, may be provided. The burner 176 shown in FIG. 7 is similar in construction to burner 76 shown in FIG. 5 except that housing 112 is somewhat elongated and is provided with a plurality of spaced holes 118 through which secondary air may enter. A slidable sleeve 120 circumposes housing 112 in mating relation and may be adjustably positioned to cover more or less of the areas of holes 118 and define therewith means for controlling the amount of secondary air that is inspirated by nozzle 10C through hole 118 and introduced into admixture with the atomized fuel emanating from nozzle 10C. Means, such as thumb screw 122 extneding through threaded hole 124, may also be provided for securing the slide 120 in place, once the desired position is determined.

Although the method and apparatus of this invention have been described in detail as to the component steps and parts, it mill be understood that such detail is for the purpose of illustration and not by way of limitation. The appended claims are therefore intended to cover any such modifications coming within the true scope of the invention.

What I claim:

1. In an air to liquid atomizer, an air supply pipe; a liquid supply pipe extending through an air supply pipe and terminating in an elongated open end of substantially rectangular cross section, the delivery ends of said air pipe and said liquid pipe terminating at substantially the same point; an end orifice plate at the delivery end of said air supply pipe defining an orifice corresponding substantially to the rectangular cross section of the open end of said liquid supply pipe, said orifice having its longitudinal sides tapering from a relatively large height to a relatively small height in a direction extending from the interior side toward the exterior side of said orifice plate and in a direction toward said liquid supply pipe.

2. An air to liquid atomizer as described in claim 1 wherein there is provided a perforated ring supporting said liquid supply pipe within said air supply pipe and defining a plurality of orifices through which air is advanced.

3. Apparatus for forming glass fibers including liquid fuel burner means comprising: a free flow refractory combustion chamber an air supply pipe; and a hydrocarbon liquid supply pipe extending through said air supply pipe and terminating in an elongated open end of substantially rectangular cross section when viewed from the front of the burner, said air supply pipe terminating with an orifice plate defining an orifice of a configuration corresponding substantially to the rectangular cross section of said fuel supply pipe and having its longitudinal sides tapering in a direction extending from the interior toward the exterior of said orifice plate and in a direction toward said fuel supply pipe, and said air supply pipe and said liquid supply pipe terminating at substantially the same point.

4. Apparatus as described in claim 3 which further comprises liquid treating spray means comprising a spray nozzle having a propellant supply pipe; a liquid treating material supply pipe extending through said propellant supply pipe and terminating in an elongated open end of substantially rectangular cross section when viewed from the front of the nozzle, said propellant supply pipe terminating at substantially the same point as said liquid treating material supply pipe and with an orifice having a configuration corresponding substantially to the rectangular cross section of said liquid treating material supply pipe and having its longitudinal sides tapering in a direction extending from the interior toward the exteror of said orifice and in a direction toward said liquid treating material supply pipe.

5. Burner means as described in claim 3 further comprising: means for introducing a gaseous fuel component to said combustion chamber.

6. Apparatus for forming glass fibers including a liquid fuel burner comprising: a refractory combustion chamber; an air supply pipe conducting pressurized air to said chamber and a hydrocarbon liquid fuel supply pipe extending through said air supply pipe and terminating in an elongated open end of substantially rectangular cross section when viewed from the front of the burner, said air supply pipe terminating with an orifice having a configuration corresponding substantially to the rectangular cross section of said fuel supply pipe and having its longitudinal sides tapering in a direction extending from the interior toward the exterior of said burner and in a direction toward said fuel supply pipe, said air supply pipe and said liquid supply pipe terminating at substantially the same point and being arranged so that the pressurized air aspirated liquid from and through said liquid supply pipe in a relatively flat wide stream.

7. Liquid treating spray means comprising a spray nozzle having a propellant supply pipe; a liquid treating material supply pipe extending through said propellant supply pipe and terminating in an elongated open end of substantially rectangular cross section when viewed from the front of the nozzle, said propellant supply pipe terminating at substantially the same point as said liquid treating material supply pipe and with an orifice having a configuration corresponding substantially to the rectangular cross section of said liquid treating material supply pipe and having its longitudinal sides tapering in a direction extending from the interior toward the exterior of said orifice and in a direction toward said liquid treating material supply pipe.

References Cited by the Examiner

UNITED STATES PATENTS

| | | | |
|---|---|---|---|
| 1,501,838 | 7/1924 | Cook | 158—74 |
| 1,630,974 | 5/1927 | Shelor et al. | 239—597 X |
| 2,156,121 | 4/1939 | Macrae | 158—76 |
| 2,569,699 | 10/1951 | Stalego | 158—991 X |
| 2,918,966 | 12/1959 | Ferguson | 158—11 |
| 2,946,371 | 7/1960 | Stephens et al. | 65—3 X |
| 2,967,112 | 1/1961 | Kay et al. | 118—300 X |
| 3,025,202 | 3/1962 | Morgan et al. | 65—3 X |
| 3,048,217 | 8/1962 | Denniston | 65—16 X |

DONALL H. SYLVESTER, *Primary Examiner.*

C. VAN HORN, R. L. LINDSAY, *Assistant Examiners.*